US009533730B2

(12) United States Patent
Yu et al.

(10) Patent No.: US 9,533,730 B2
(45) Date of Patent: Jan. 3, 2017

(54) TWO STAGE QUICK-RELEASE STRUCTURE FOR FOLDABLE BICYCLE

(71) Applicant: Fairly Bike Manufacturing Co., Ltd, New Taipei (TW)

(72) Inventors: Yu-Chi Yu, New Taipei (TW); Min-Jhang He, New Taipei (TW); Cheng-Li Lin, New Taipei (TW)

(73) Assignee: FAIRLY BIKE MANUFACTURING CO., LTD, New Taipei (TW)

( * ) Notice: Subject to any disclaimer, the term of this patent is extended or adjusted under 35 U.S.C. 154(b) by 529 days.

(21) Appl. No.: 14/247,344

(22) Filed: Apr. 8, 2014

(65) Prior Publication Data

US 2014/0356050 A1    Dec. 4, 2014

(30) Foreign Application Priority Data

May 29, 2013    (TW) .............................. 102210003 U

(51) Int. Cl.
*B62K 15/00* (2006.01)
*B62K 19/18* (2006.01)

(52) U.S. Cl.
CPC ............ *B62K 19/18* (2013.01); *B62K 15/006* (2013.01); *B62K 2206/00* (2013.01); *Y10T 403/32532* (2015.01)

(58) Field of Classification Search
CPC ....... B62K 19/18; B62K 15/00; B62K 15/001; B62K 15/006; B62K 15/008; B62K 2206/00; Y10T 403/32532; Y10T 403/32409; Y10T 403/32319; Y10T 403/32352; Y10T 24/3403; Y10T 24/3405; Y10T 24/3407
See application file for complete search history.

(56) References Cited

U.S. PATENT DOCUMENTS 2,394,494 A  *  2/1946  Schwinn .............. B62K 15/006
                                                              280/178
4,440,414 A  *  4/1984  Wang ................... B62K 15/008
                                                              280/278

(Continued)

FOREIGN PATENT DOCUMENTS

CN            203419223         2/2014

OTHER PUBLICATIONS

United Kingdom Office Action dated Sep. 24, 2014.
English translation of abstract of CN 203419223 (published Feb. 5, 2014).

*Primary Examiner* — Jonathan Masinick
(74) *Attorney, Agent, or Firm* — McClure, Qualey & Rodack, LLP

(57) ABSTRACT

A two stage quick-release structure includes a first tubing member, a second tubing member, a first pivoting portion, a first buckling portion, an elastic hook and a safety fastener. When the user assembles the foldable bicycle for bicycling, the first tubing member is rotated to connect with the second tubing member via the first pivoting portion, so that the elastic hook correspondingly buckles with the first buckling portion to form a first stage buckle; then, the safety fastener is rotated to correspondingly buckle with the elastic hook so as to form a second stage buckle. The two stage buckle contributes the assembling of the foldable bicycle with ease and convenience. Furthermore, via the two stage buckle structures, the connection between the front bicycle frame body and the rear bicycle frame body are tightly secured.

12 Claims, 13 Drawing Sheets

(56) References Cited

U.S. PATENT DOCUMENTS

| | | | | |
|---|---|---|---|---|
| 5,440,948 A | * | 8/1995 | Cheng | B62K 15/006 280/278 |
| 5,906,452 A | * | 5/1999 | Lee | B62K 15/006 280/278 |
| 7,828,312 B1 | * | 11/2010 | Yeh | B62K 15/006 280/278 |
| 2015/0042065 A1 | * | 2/2015 | Wang | B62K 15/008 280/287 |

* cited by examiner ated in Taiwan, R.O.C. on 2013 May 29, the entire contents of which are hereby incorporated by reference.

TWO STAGE QUICK-RELEASE STRUCTURE FOR FOLDABLE BICYCLE

CROSS-REFERENCES TO RELATED APPLICATIONS

This non-provisional application claims priority under 35 U.S.C. §119(a) on Patent Application No. 102210003 filed in Taiwan, R.O.C. on 2013 May 29, the entire contents of which are hereby incorporated by reference.

BACKGROUND

Technical Field

The disclosure relates to a two stage quick-release structure, and particularly to a two stage quick-release structure for foldable bicycle.

Related Art

Foldable bicycles were invented for convenient storage and carrying. Commonly, a quick-release structure is assembled on the bicycle frame. Therefore, when the bicycle is not in use, the user can release the quick-release structure of the foldable bicycle quickly to fold and store the foldable bicycle; while when the foldable bicycle is in use, the user can assemble the foldable bicycle quickly without using additional tools.

Different kinds of quick-release structures are commercially available. Typically, two combining blocks are applied as the quick-release structure; one ends of the two combining blocks are connected via a pivoting shaft with the unconnected ends of the two combining blocks respectively having buckling members. The combining means of the buckling members can be different. As shown in FIG. 1, the buckling hook is applied as the buckling members. A first combining block 91 and a second combining block 92 are respectively soldered on the front bicycle frame body and the rear bicycle frame body, and the first combining block 91 is rotatable relative to the second combining block 92 via a pivoting shaft 93. The first combining block 91 has an engaging portion 94, and the second combining block 92 has a buckling handle 95 pivotally disposed thereon. The buckling handle 95 includes a buckling hook 951 and a protruding member 952. When the user assembles the foldable bicycle, firstly, the front bicycle frame body is rotated relative to the rear bicycle frame body via the pivoting shaft 93 so that the first combining block 91 is correspondingly combined with the second combining block 92. Then, the buckling hook 951 of the buckling handle 95 is hooked with the engaging portion 94 of the first combining block 91 and fastened with the bicycle frame on where the second combining block 92 is soldered (here, the second combining block 92 is soldered on the rear bicycle frame body). Thereafter, a safety fastener 96 on the rear bicycle frame body is rotated to buckle with the protruding member 952 of the buckling handle 95 so as to prevent from the buckling handle 95 loosing from the engaging portion 94 during bicycling. However, such combining means applies only one buckling hook to combine the bicycle frames, thus contributing to the issues of unsecure combining and ease of detaching during bicycling or after long term use.

Additionally, the first combining block 91 and the second combining block 92 are combined with the bicycle frames by means of soldering mostly, which will leave apparent welding marks; furthermore, since widths of the first and second combining blocks 91, 92 are larger than the diameter of the bicycle frame, the appearance of the foldable bicycle is not attractive.

SUMMARY

In view of this, the disclosure provides a two stage quick-release structure for foldable bicycle. The two stage quick-release structure includes a first tubing member, a second tubing member, a first pivoting portion, a first buckling portion, an elastic hook and a safety fastener. The first tubing member includes a first connecting member and an assembling portion. The first connecting member is disposed at a lateral side of an axial opening of the first tubing member. The assembling portion is disposed on another side of the first tubing member which is opposite to the first connecting member. The second tubing member is adjacently connected to the lateral side of the axial opening of the first tubing member and includes a second connecting member. The second connecting member is disposes on a section of the second tubing member which corresponds to the first connecting member. The first pivoting portion is passing through the first connecting member and the second connecting member, so that the first tubing member is rotated to connect with the second tubing member via the first pivoting portion.

The first buckling portion is assembled on the assembling portion. The elastic hook is pivotally assembled on another side of the second tubing member and corresponds to the first buckling portion, in which another side of the second tubing member is opposite to the second connecting member. The safety fastener is pivotally assembled on the first tubing member and includes an extended handle, a second buckling portion and a second pivoting portion. The second pivoting portion is disposed at one end of the extended handle. The second buckling portion is disposed at another end of the extended handle which is far from the second pivoting portion.

When the first tubing member is rotated to connect with the second tubing member via the first pivoting portion, the elastic hook correspondingly buckles with the first buckling portion to form a first stage buckle. Then, the safety fastener is rotated to come close to the elastic hook by the second pivoting portion, so that the second buckling portion correspondingly buckles with the elastic hook to form a second stage buckle. Via the application of the first and second stage buckle, the bicycle frames are securely connected with each other, thereby improving the safety upon bicycling.

The detailed features and advantages of the disclosure are described below in great detail through the following embodiments, the content of the detailed description is sufficient for those skilled in the art to understand the technical content of the disclosure and to implement the disclosure there accordingly. Based on the content of the specification, the claims, and the drawings, those skilled in the art can easily understand the relevant objectives and advantages of the disclosure.

BRIEF DESCRIPTION OF THE DRAWINGS

The disclosure will become more fully understood from the detailed description given herein below for illustration only and thus not limitative of the disclosure, wherein.

DETAILED DESCRIPTION

Figure 1:
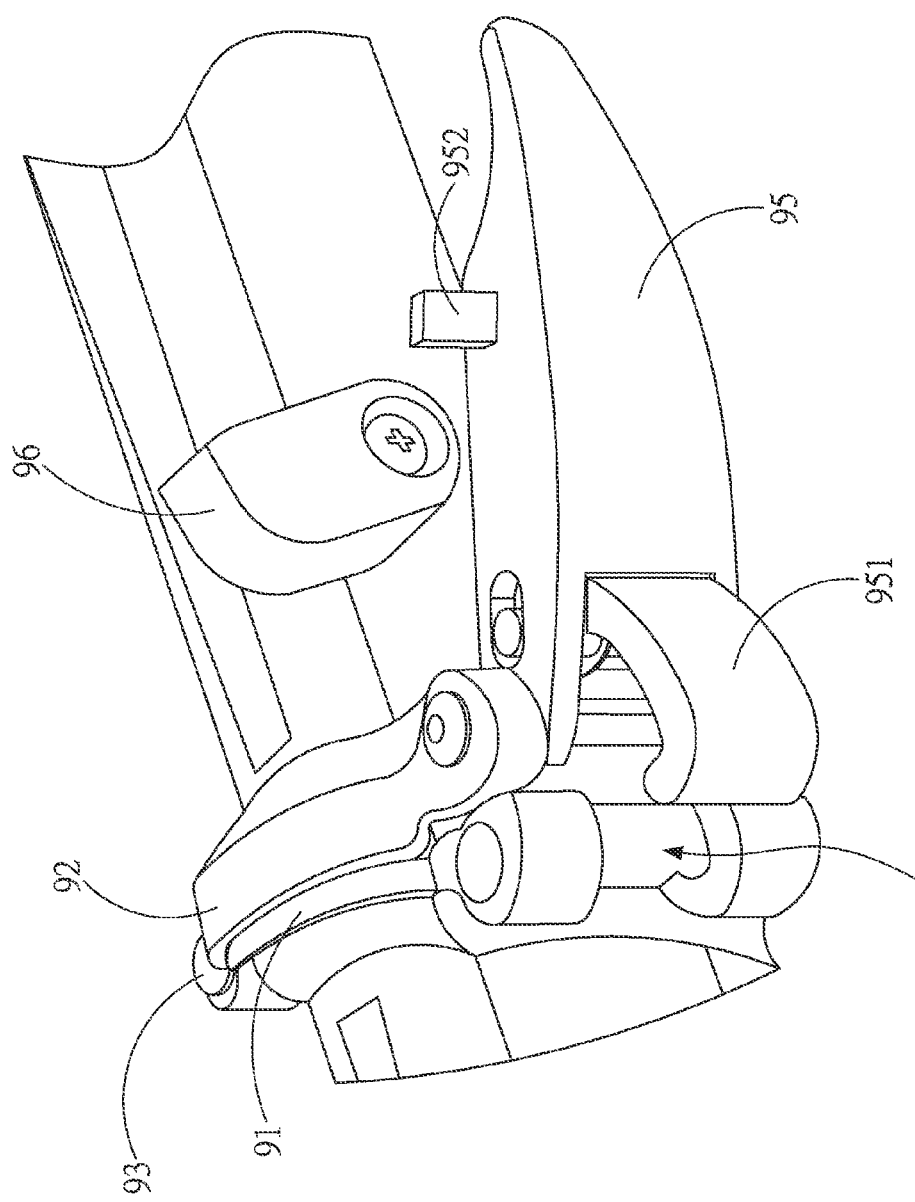
FIG. 1 is a prior art of perspective view of a conventional quick-release structure.
Figure 2:
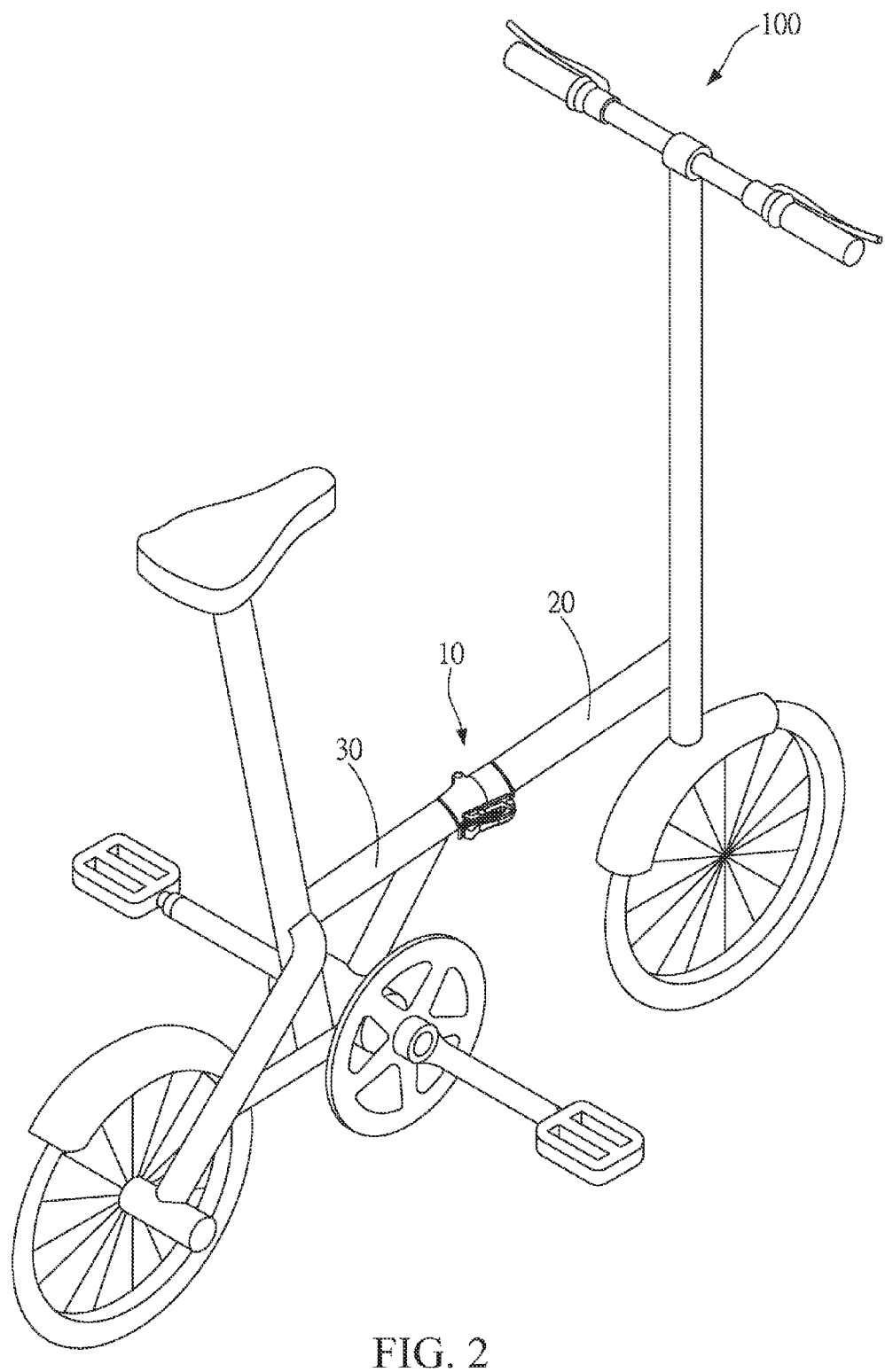
FIG. 2 is a perspective view of a foldable bicycle of a first embodiment of the disclosure.

Please refer to FIG. 2, which is a perspective view of a foldable bicycle 100 of the first embodiment. A two stage quick-release structure 10 is assembled on the bicycle frame of the foldable bicycle 100. The connecting section of the foldable bicycle 100 is the two stage quick-release structure 10, so that the bicycle frame is divided into a front bicycle frame body 20 and a rear bicycle frame body 30. The two stage quick-release structure 10 can also be applied to other sections of the bicycle, such as the connecting section between the seat and the bicycle frame, or the connecting section between the handle and the bicycle frame.

Figure 3:
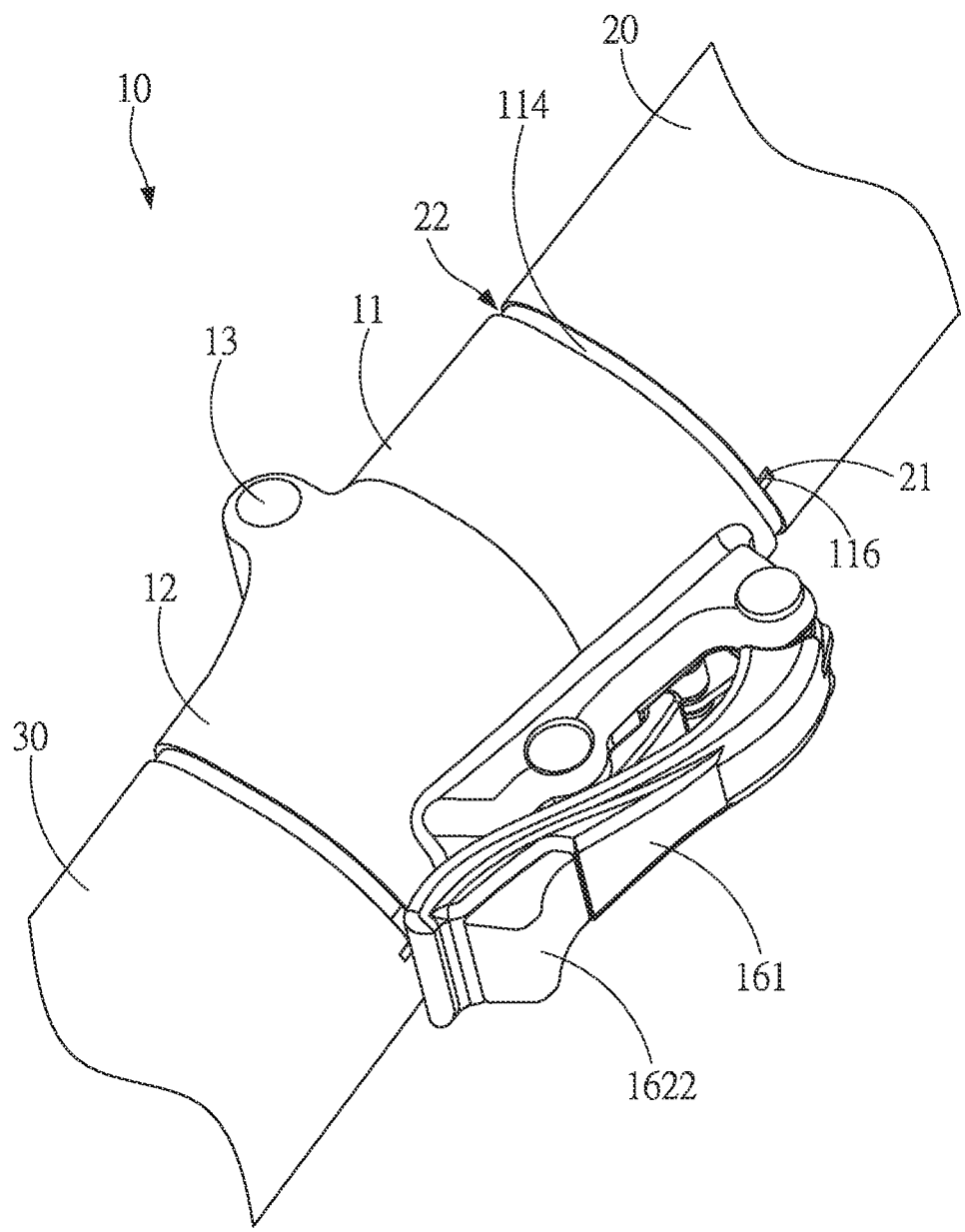
FIG. 3 is a perspective view of a two stage quick-release structure of the foldable bicycle of the first embodiment of the disclosure.
Figure 4:
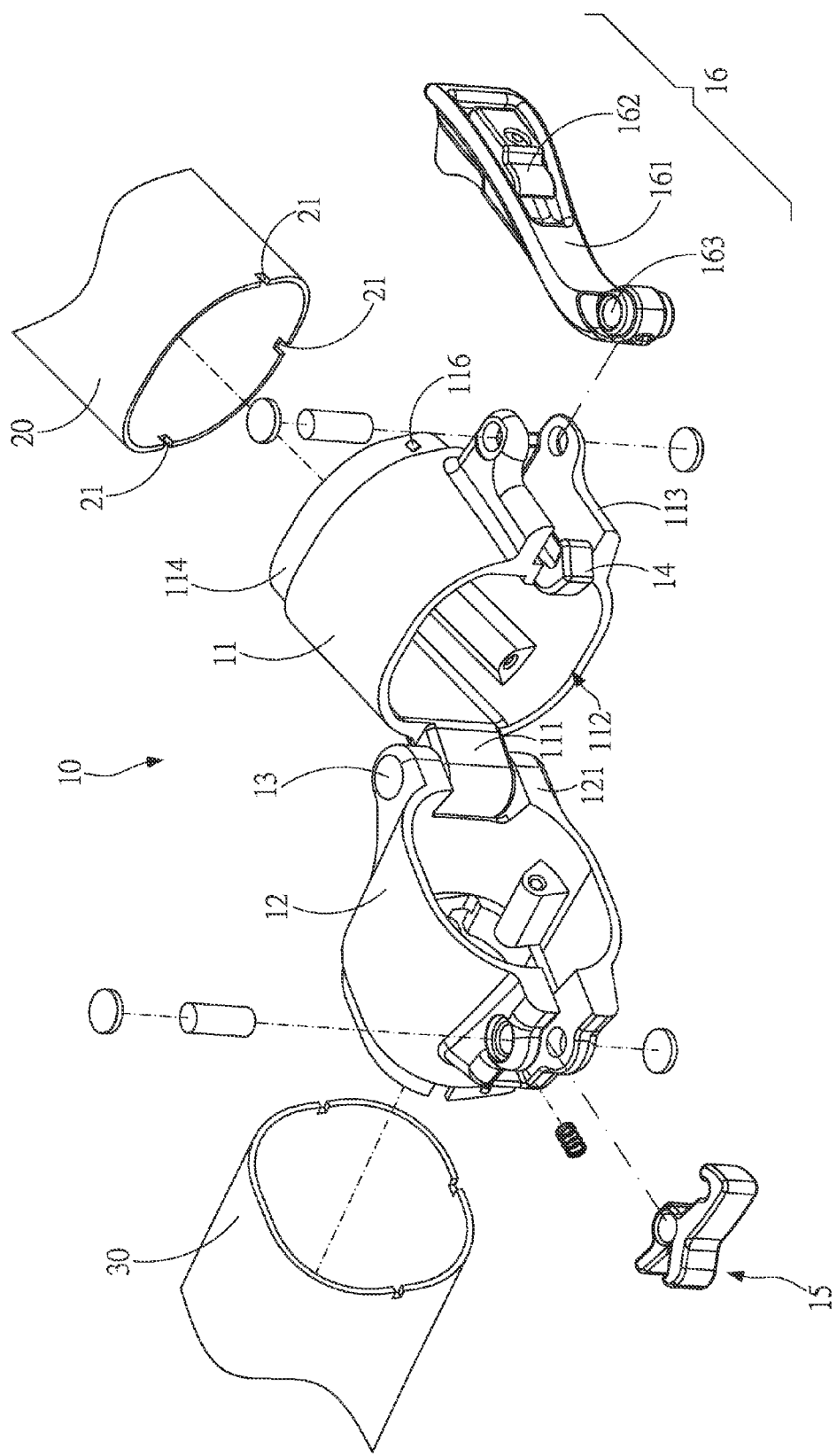
FIG. 4 is an exploded view of the two stage quick-release structure of the foldable bicycle of the first embodiment of the disclosure.

Please refer to FIG. 3 and FIG. 4, which are respectively a perspective view and an exploded view of the two stage quick-release structure 10 of the foldable bicycle 100 of this embodiment. In this embodiment, the two stage quick-release structure 10 includes a first tubing member 11, a second tubing member 12, a first pivoting portion 13, a first buckling portion 14, an elastic hook 15 and a safety fastener 16.

The first tubing member 11 includes a first connecting member 111, an assembling portion 113 and a connecting tubing 114. The first connecting member 111 is disposed at a lateral side of an axial opening 112 of the first tubing member 11. The assembling portion 113 is disposed on another side of the first tubing member 11 which is opposite to the first connecting member 111.

The connecting tubing 114 is protruded from an opening of another side of the first tubing member 11 along an axial direction of the first tubing member 11 in which another side of the first tubing member 11 is opposite to the axial opening 112. The outer diameter of the connecting tubing 114 is smaller than the outer diameter of the first tubing member 11. The first tubing member 11 is connected to the front bicycle frame body 20 via soldering. For providing an attractive appearance, the outer diameter of the first tubing member 11 is substantially equal to the outer diameter of the front bicycle frame body 20, so that after the welding process and the painting process, the first tubing member 11 and the front bicycle frame body 20 seem like an integrated whole. As shown in FIG. 3 and FIG. 4, after the front bicycle frame body 20 is sleeved with the connecting tubing 114 of the first tubing member 11, an interval is maintained between the front bicycle frame body 20 and the first tubing member 11 so as to form an indentation 22. Via filling and spreading the welding solders in the indentation 22, the welded plane is aligned smoothly with the outer surface of the front bicycle frame body 20 and the first tubing member 11 so as to reduce the welding marks and smooth the connecting section.

Furthermore, to prevent the front bicycle frame body 20 from rotating relative to the first tubing member 11 during soldering process, at least one positioning rod 116 is protrudingly assembled on the outer periphery of the connecting tubing 114. In this embodiment, the number of the positioning rods 116 is three, but embodiments are not limited thereto. At least one positioning indentation 21 corresponding to the at least one positioning rod 116 is recessed from the front bicycle frame body 20.

The second tubing member 12 is adjacently connected to the lateral side of the axial opening 112 of the first tubing member 11 and includes a second connecting member 121. The second connecting member 121 is disposed on a section of the second tubing member 12 which corresponds to the first connecting member 111. The first pivoting portion 13 is passing through the first connecting member 111 and the second connecting member 121, so that the first tubing member 11 is rotated to connect with the second tubing member 12 via the first pivoting portion 13. Another side of the second tubing member 12 is connected with the rear bicycle frame body 30 in which another side of the second tubing member 12 is far from the first tubing member 11. Similarly, the second tubing member 12 and the rear bicycle frame body 30 are combined with each other via soldering, and the detailed structures of the second tubing member 12 and the rear bicycle frame body 30 are similar to that of the first tubing member 11 and the front bicycle frame body 20 so as to be omitted.

Please refer to FIG. 4, in which the first buckling portion 14 is assembled on the assembling portion 113; in this embodiment, the first buckling portion 14 is securely assembled on the assembling portion 113; that is, the first buckling portion 14 and the first tubing member 11 are integrally formed as a whole. The elastic hook 15 is pivotally assembled on another side of the second tubing member 12 and corresponds to the first buckling portion 14, in which another side of the second tubing member 12 is opposite to the second connecting member 121. When the first tubing member 11 is rotated to connect with the second tubing member 12 via the first pivoting portion 13, the elastic hook 15 correspondingly buckles with the first buckling portion 14 to form a first stage buckle.

The safety fastener 16 is pivotally assembled on the first tubing member 11 and disposed at an outer side of the first buckling portion 14. The safety fastener 16 includes an extended handle 161, a second buckling portion 162 and a second pivoting portion 163. The second pivoting portion 163 is disposed at one end of the extended handle 161. The second buckling portion 162 is disposed at another end of the extended handle 161 which is far from the second pivoting portion 163. When the safety fastener 16 is rotated to come close to the elastic hook 15 by the second pivoting portion 163, the second buckling portion 162 correspondingly buckles with the elastic hook 15 to form a second stage buckle.

Via the two stage buckle structures, the connection between the front bicycle frame body 20 and the rear bicycle frame body 30 are tightly secured. The first stage buckle applies simple buckling structures; upon operation, the user only needs to pivotally rotate the first tubing member 11 relative to the second tubing member 12 to connect the first tubing member 11 with the second tubing member 12, so that the first tubing member 11 can be buckled with the second tubing member 12. The second stage buckle avoids the releasing of the first stage buckle due to the elastic hook 15 is pressed unintentionally during bicycling; furthermore, the second stage buckle strengthens the buckling between the first tubing member 11 and the second tubing member 12.

Figure 5:
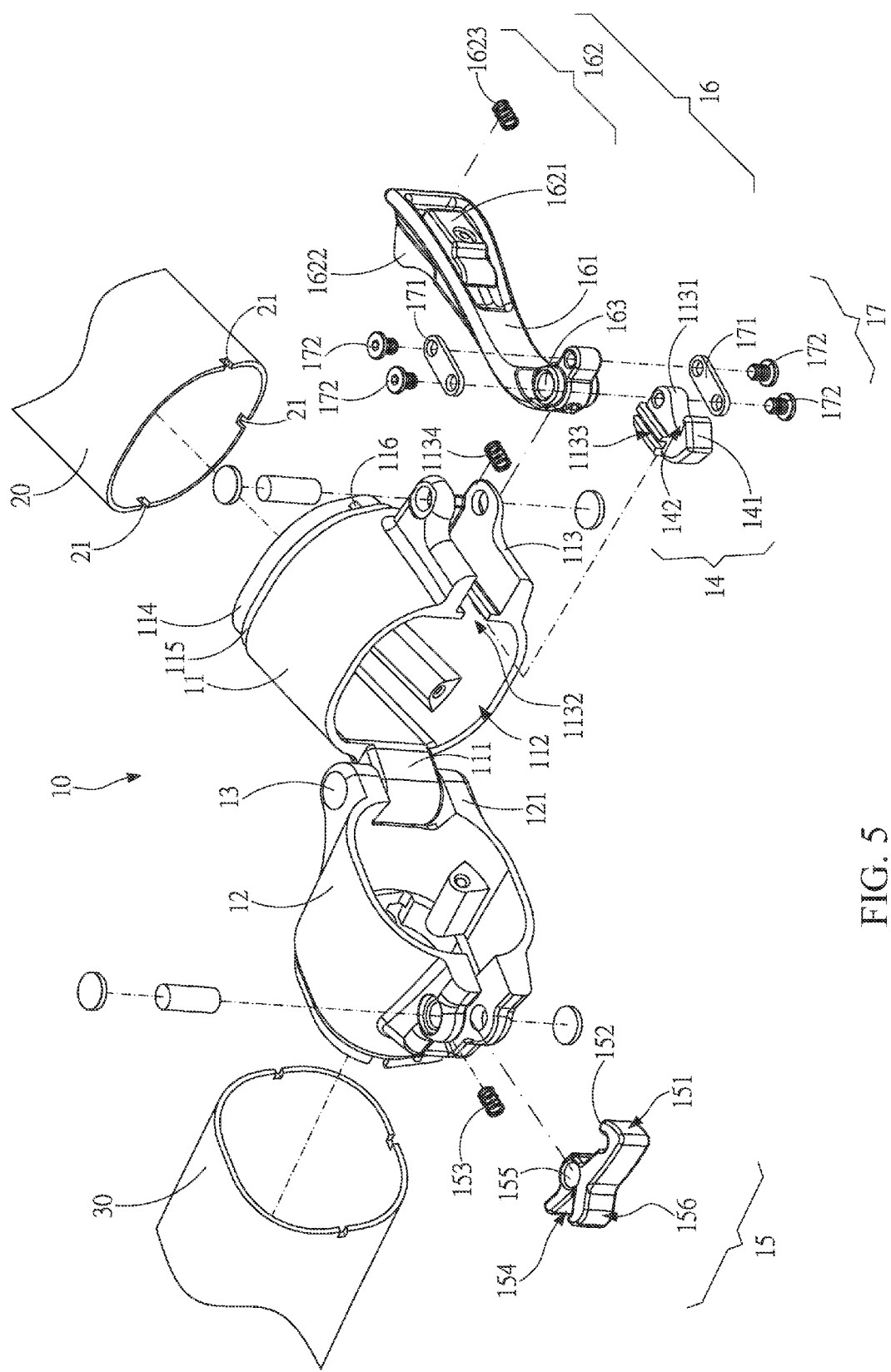
FIG. 5 is an exploded view of a two stage quick-release structure of a foldable bicycle of a second embodiment of the disclosure.
Figure 6:
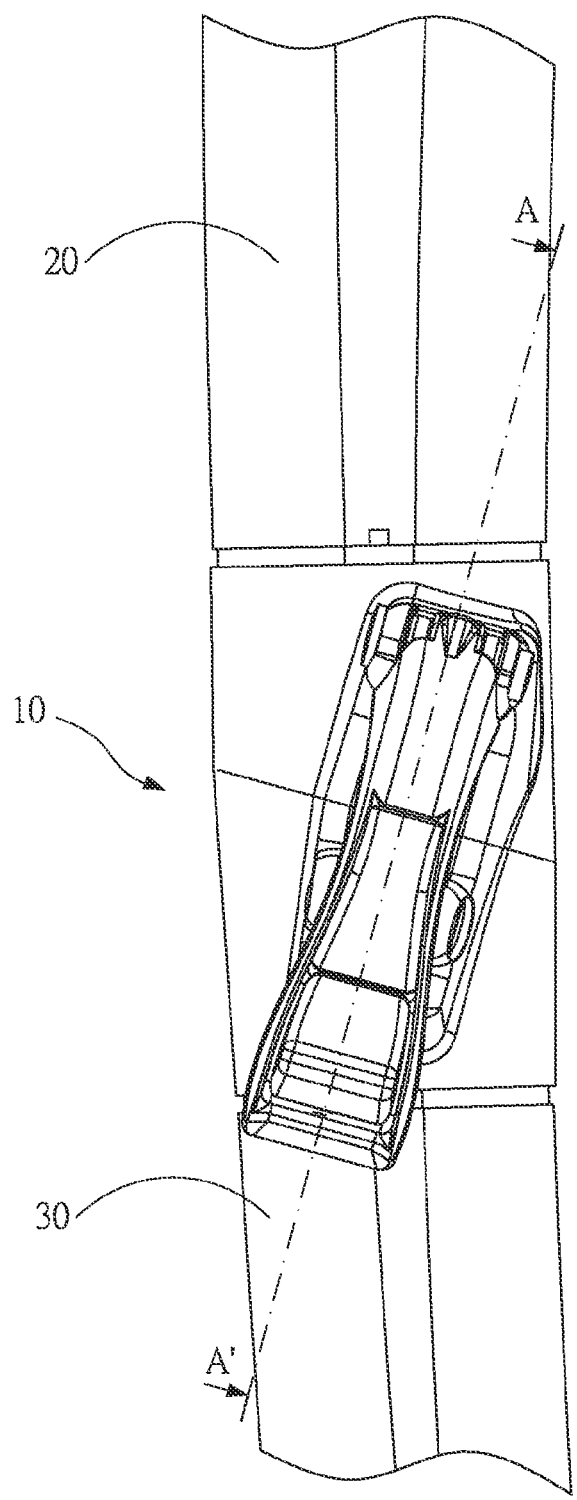
FIG. 6 is a lateral view of the two stage quick-release structure for foldable bicycle of the second embodiment of the disclosure.
Figure 7:
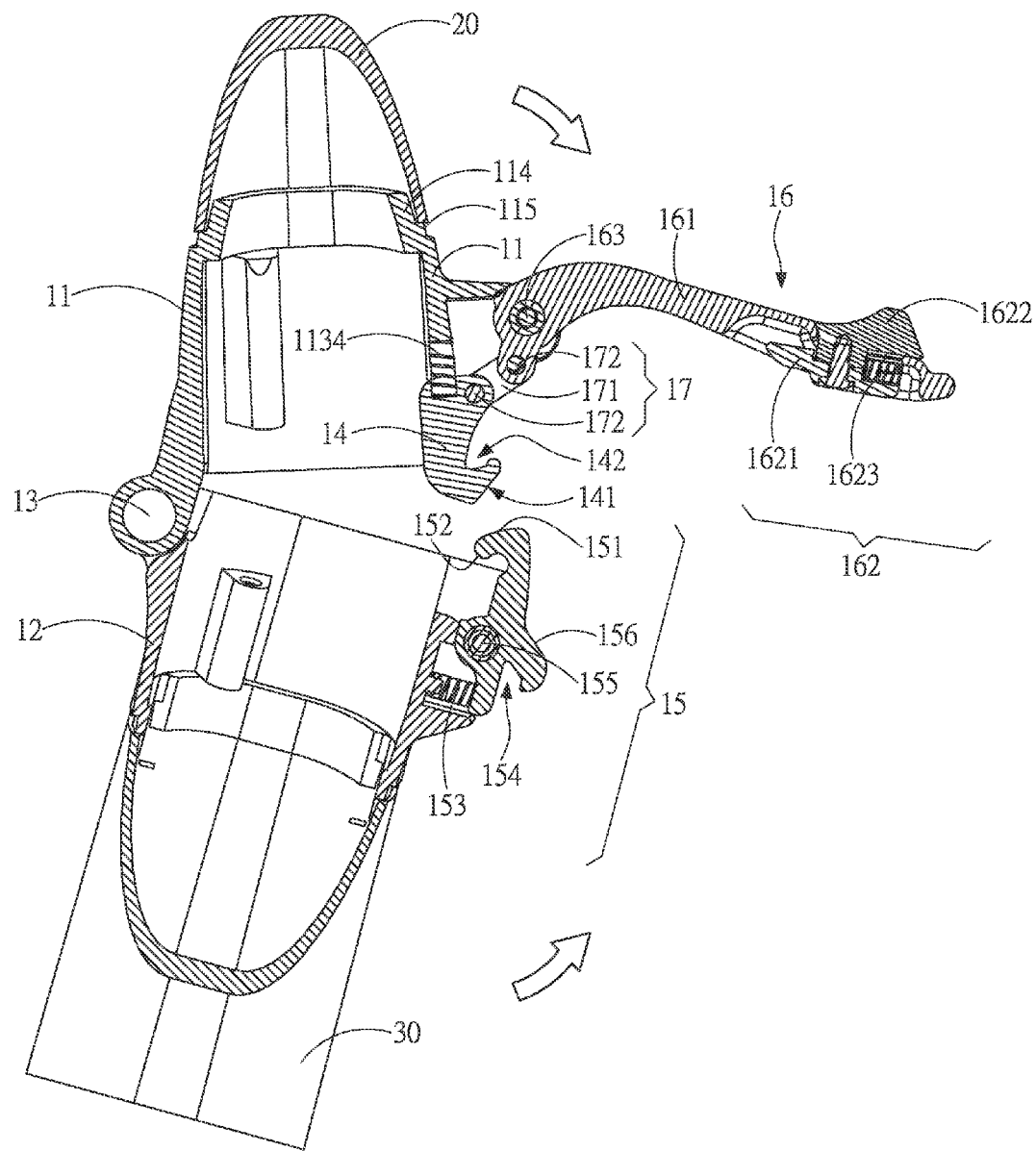
FIG. 7 to FIG. 13 are the cross sectional views of the two stage quick-release structure for foldable bicycle of the second embodiment of the disclosure.

Please refer to FIG. 5 to FIG. 7, which are respectively an exploded view, a lateral view and a cross-sectional view of a two stage quick-release structure 10 of a second embodiment of the disclosure. The A-A' line shown in FIG. 6 is applied as the cross-sectional lines in FIG. 7 to FIG. 13. In this embodiment, the two stage quick-release structure 10 includes a first tubing member 11, a second tubing member 12, a first pivoting portion 13, a first buckling portion 14, an elastic hook 15 and a safety fastener 16.

The first tubing member 11 includes a first connecting member 111, an assembling portion 113 and a connecting tubing 114. The first connecting member 111 is disposed at a lateral side of an axial opening 112 of the first tubing member 11. The assembling portion 113 is disposed on another side of the first tubing member 11 which is opposite to the first connecting member 111.

Similar to the first embodiment, in this embodiment, the first tubing member 11 is connected to the front bicycle frame body 20 via soldering. The connecting tubing 114 is protruded from an opening of another side of the first tubing member 11 along an axial direction of the first tubing member 11 in which another side of the first tubing member 11 is opposite to the axial opening 112. The outer diameter of the connecting tubing 114 is smaller than the outer diameter of the first tubing member 11. To prevent the front bicycle frame body 20 from rotating relative to the first tubing member 11 during soldering process, at least one positioning rod 116 is protrudingly assembled on the outer periphery of the connecting tubing 114. In this embodiment, the number of the positioning rods 116 is three. At least one positioning indentation 21 corresponding to the at least one positioning rod 116 is recessed from the front bicycle frame body 20. The structure of the two stage quick-release structure 10 in the second embodiment is approximately similar to that of the two stage quick-release structure 10 in the first embodiment, except that in this embodiment, a stopping portion 115 is assembled on a connecting section between the outer periphery of the connecting tubing 114 and the first tubing member 11. The stopping portion 115 can be a plurality of stopping blocks or a stopping structure disposed around the periphery of the connecting tubing 114. In this embodiment, the stopping portion 115 is annularly disposed. The outer diameter of the stopping portion 115 is smaller than the outer diameter of the first tubing member 11, but larger than the outer diameter of the connecting tubing 114. As shown in FIG. 5 and FIG. 7, the outer diameters of the first tubing member 11, the stopping portion 115 and the connecting tubing 114 are gradually reduced to form two stage differences.

Upon assembling, the front bicycle frame body 20 is sleeved with the connecting tubing 114 and abutting against the stopping portion 115, so that an interval is maintained between the first tubing member 11 and the front bicycle frame body 20; at this moment, an indentation 22 is formed between the first tubing member 11, the stopping portion 115 and the front bicycle frame body 20. Via filling the welding solders in the indentation 22, the front bicycle frame body 20 is securely connected to the first tubing member 11 with the welded plane being aligned smoothly. With the assembling of the stopping portion 115, the user does not need to adjust the distance between the clamps applied to clamp the first tubing member 11 and the front bicycle frame body 20 to form the indentation 22 between the first tubing member 11 and the front bicycle frame body 20 upon soldering; the user only needs to push the front bicycle frame body 20 to abut against the stopping portion 115 for the further soldering process.

The second tubing member 12 is adjacently connected to the lateral side of the axial opening 112 of the first tubing member 11 and includes a second connecting member 121 disposed at a section of the second tubing member 12 which corresponds to the first connecting member 111. The first pivoting portion 13 is passing through the first connecting member 111 and the second connecting member 121, so that the first tubing member 11 is rotated to connect with the second tubing member 12 via the first pivoting portion 13. Another side of the second tubing member 12 is connected with the rear bicycle frame body 30 in which another side of the second tubing member 12 is far from the first tubing member 11. Similarly, the second tubing member 12 and the rear bicycle frame body 30 are combined with each other via soldering, and the detailed structures of the second tubing member 12 and the rear bicycle frame body 30 are similar to that of the first tubing member 11 and the front bicycle frame body 20 so as to be omitted.

Please refer to FIG. 5, in which the first buckling portion 14 is assembled on the assembling portion 113. The assembling portion 113 includes a slidable member 1131, a guiding portion 1132, an elastic member 1134 and a connecting member 17. The slidable member 1131 of the assembling portion 113 is slidably assembled in the guiding portion 1132. Here, the guiding portion 1132 is an open slot having two rails, and the slidable member 1131 has two sliding grooves 1133 recessed therein. The slidable member 1131 is slidably assembled in the guiding portion 1132 via the sliding grooves 1133. The elastic member 1134 is disposed between the slidable member 1131 and the first tubing member 11 and provides a resilient force for the slidable member 1131 to come close to the elastic hook 15.

One end of the connecting member 17 is pivotally assembled on the slidable member 1131, and another end of the connecting member 17 is pivotally assembled on the safety fastener 16. In this embodiment, the connecting member 17 includes two connecting plates 171 and four locking members 172. As shown in FIG. 5, the two connecting plates 171 clamp one end of the slidable member 1131 and one end of the safety fastener 16 in an upward-downward manner, then, with the locking members 172, one ends of the two connecting plates 171 are locked to the slidable member 1131, and another ends of the two connecting plates 171 are locked to the safety fastener 16.

The first buckling portion 14 includes an inclined plane 141 and a buckling groove 142. The inclined plane 141 of the first buckling portion 14 is located at an outer lateral side of the buckling groove 142.

The elastic hook 15 is pivotally assembled on another side of the second tubing member 12 and corresponds to the first buckling portion 14, in which another side of the second tubing member 12 is opposite to the second connecting member 121. The elastic hook 15 includes an abutting plane 151, a hook portion 152, a resilient member 153, a hook groove 154, a third pivoting portion 155 and a guiding plane 156. The elastic hook 15 is pivotally assembled on the second tubing member 12 via the third pivoting portion 155. The hook portion 152 is disposed at one side of the third pivoting portion 155; the hook groove 154 is located at another side of the third pivoting portion 155 and opposite to the hook portion 152. The abutting plane 151 is located at a front lateral side of the hook groove 154. The resilient member 153 is disposed between the elastic hook 15 and the second tubing member 12 and provides a rotating resilient force for the hook portion 152 of the elastic hook 15 to come close to the second tubing member 12.

The safety fastener 16 includes an extended handle 161, a second buckling portion 162 and a second pivoting portion 163. The second pivoting portion 162 is disposed at one end of the extended handle 161, and the second buckling portion 162 is disposed at another end of the extended handle 161 which is far from the second pivoting portion 163. The safety fastener 16 is pivotally assembled on the outer side of the first buckling portion 14 of the first tubing member 11 via the second pivoting portion 163. The second buckling portion 162 includes a buckling member 1621, a pulling member 1622 and a recoverable member. The recoverable member is a member capable of providing a recovery force, such as a reed, an elastic component, etc. Here, the recoverable member is a spring 1623. The pulling member 1622 is slidably assembled on one end of the extended handle 161 and slidable along the length direction of the extended handle 161. The buckling member 1621 is locked on the pulling member 1622 via screws. The buckling member 1621 and the pulling member 1622 are respectively located at two sides of the extended handle 161. The spring 1623 is abutted between the buckling member 1621 and the extended handle 161 to provide a resilient force for the pulling member 1622 to come close to the second pivoting portion 163.

The buckling method of the two stage quick-release structure 10 upon assembling the foldable bicycle 100 is described in the following paragraphs. Please refer to FIG. 7 to FIG. 9, which are the cross sectional views of the two stage quick-release structure 10 of the foldable bicycle 100 of the second embodiment. As shown in FIG. 7, when the user assembles the bicycle frame body for bicycling, the front bicycle frame body 20 and the rear bicycle frame body 30 are rotated to come close with each other along the direction illustrated in the figure; in this moment, the first tubing member 11 is rotated to connect with the second tubing member 12 via the first pivoting portion 13.

Figure 8:
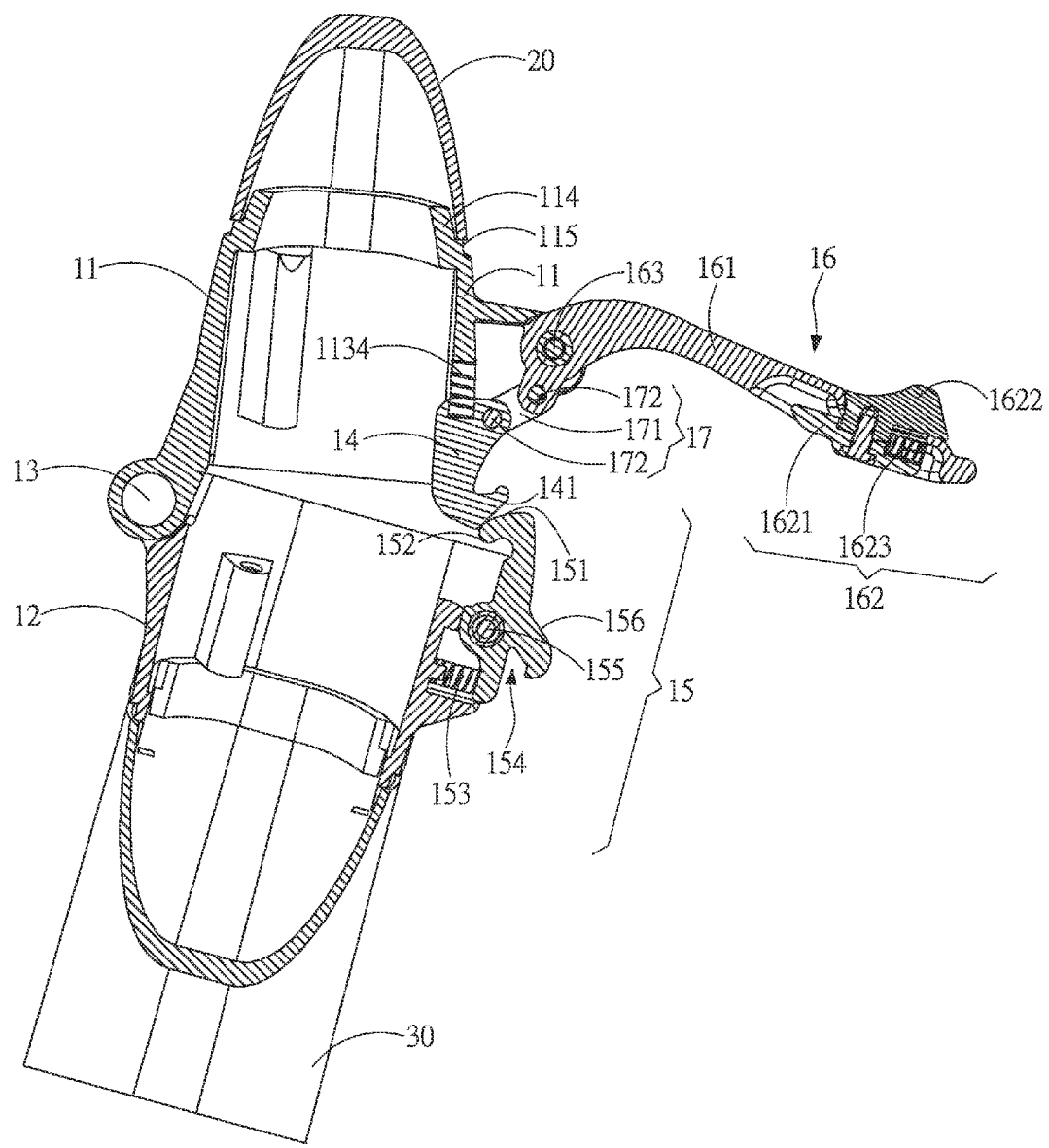
Figure 9:
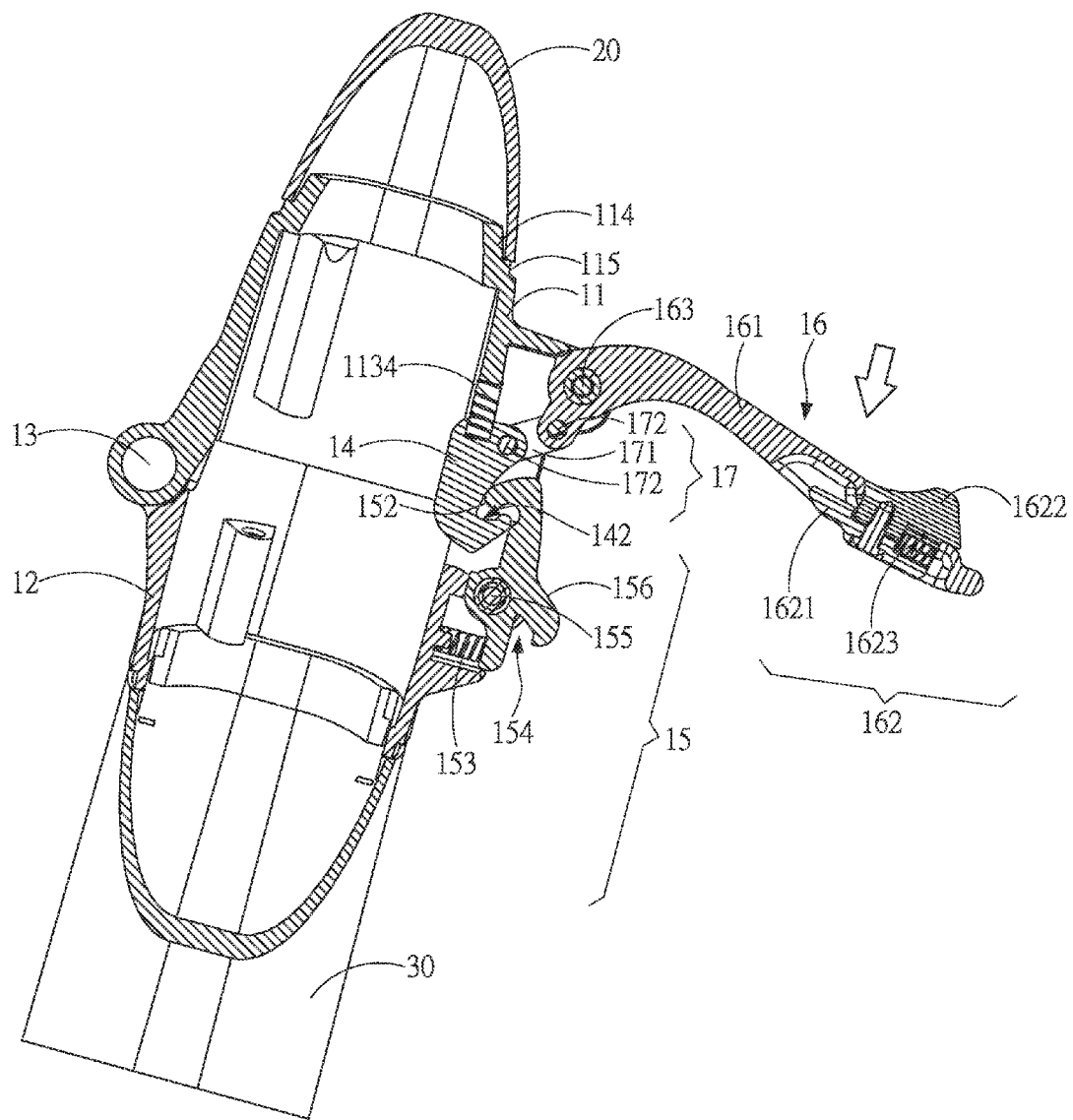

Please refer to FIG. 8 and FIG. 9, when the first tubing member 11 is rotated to connect with the second tubing member 12, the inclined plane 141 abuts against the abutting plane 151 of the elastic hook 15. The abutting force between the inclined plane 141 and the abutting plane 151 makes the elastic hook 15 rotate clockwise using the third pivoting portion 155 as a rotating center. Under this condition, the inclined plane 141 continuously abuts against the abutting plane 151 of the elastic hook 15 until the abutting plane 151 is completely detached from the inclined plane 141. At this moment, the resilient member 153 of the elastic hook 15 provides a resilient force to rotate the elastic hook 15 counterclockwise; that is, the resilient member 153 provides a rotating resilient force for the hook portion 152 of the elastic hook 15 to come close to the second tubing member 12, so that the hook portion 152 is buckled with the buckling groove 142 of the first buckling portion 14. Therefore, the first stage buckle is completed.

The first stage buckle is achieved by using the simple hook structure. The user only needs to rotate the first tubing member 11 relative to the second tubing member 12 to connect the first tubing member 11 with the second tubing member 12 firstly; then, by applying a small force, the first tubing member 11 is combined with the second tubing member 12. However, if there is only the first stage buckle, the first tubing member 11 would possibly detach from the second tubing member 12 due to unintentionally pressing the elastic hook 15 during bicycling. As a result, in the disclosure, the second stage buckle is further applied so as to prevent the elastic hook 15 from being pressed unintentionally during bicycling and prevent from the front bicycle frame body 20 separating from the rear bicycle frame body 30.

Figure 10:
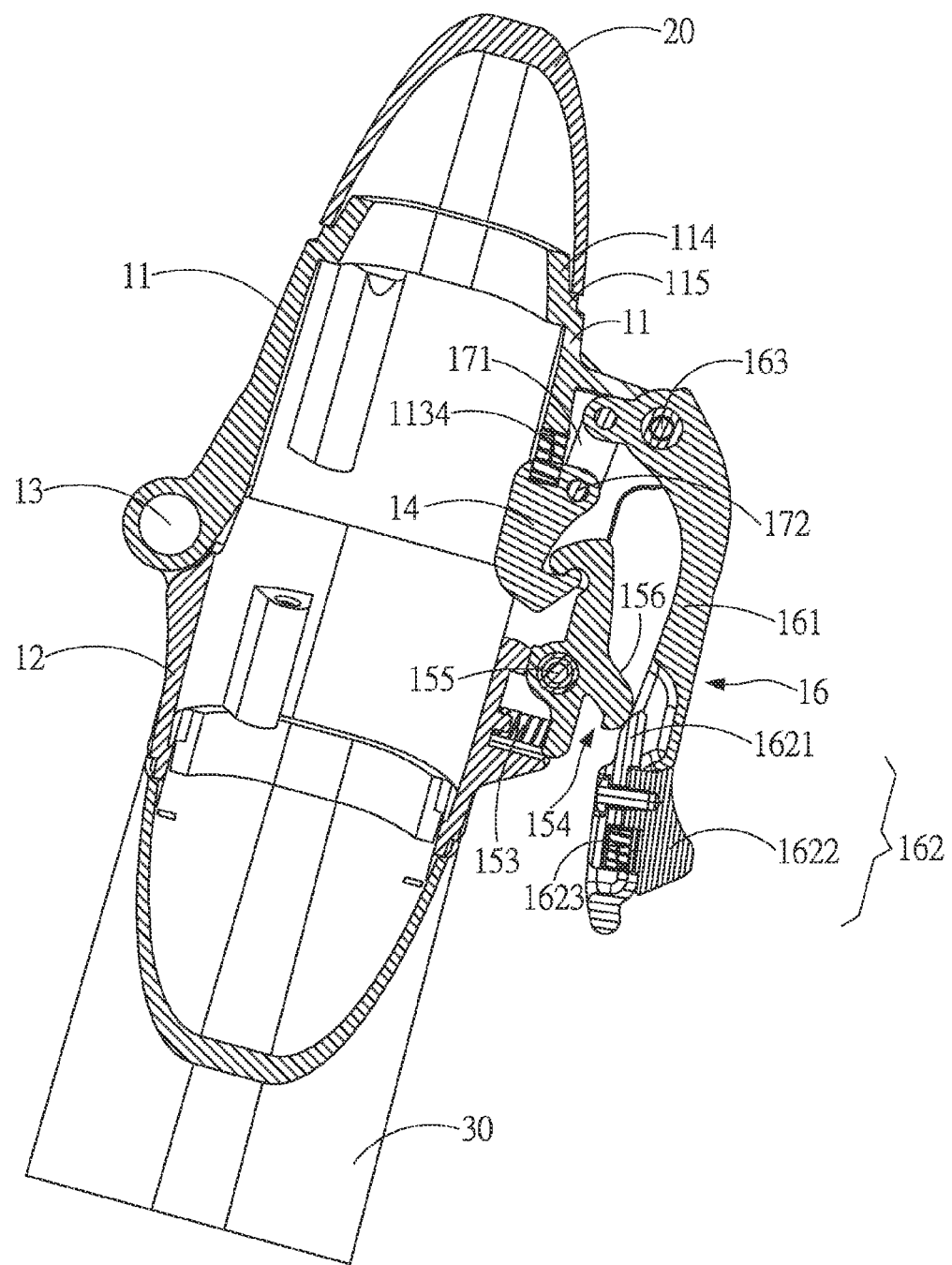
Figure 11:
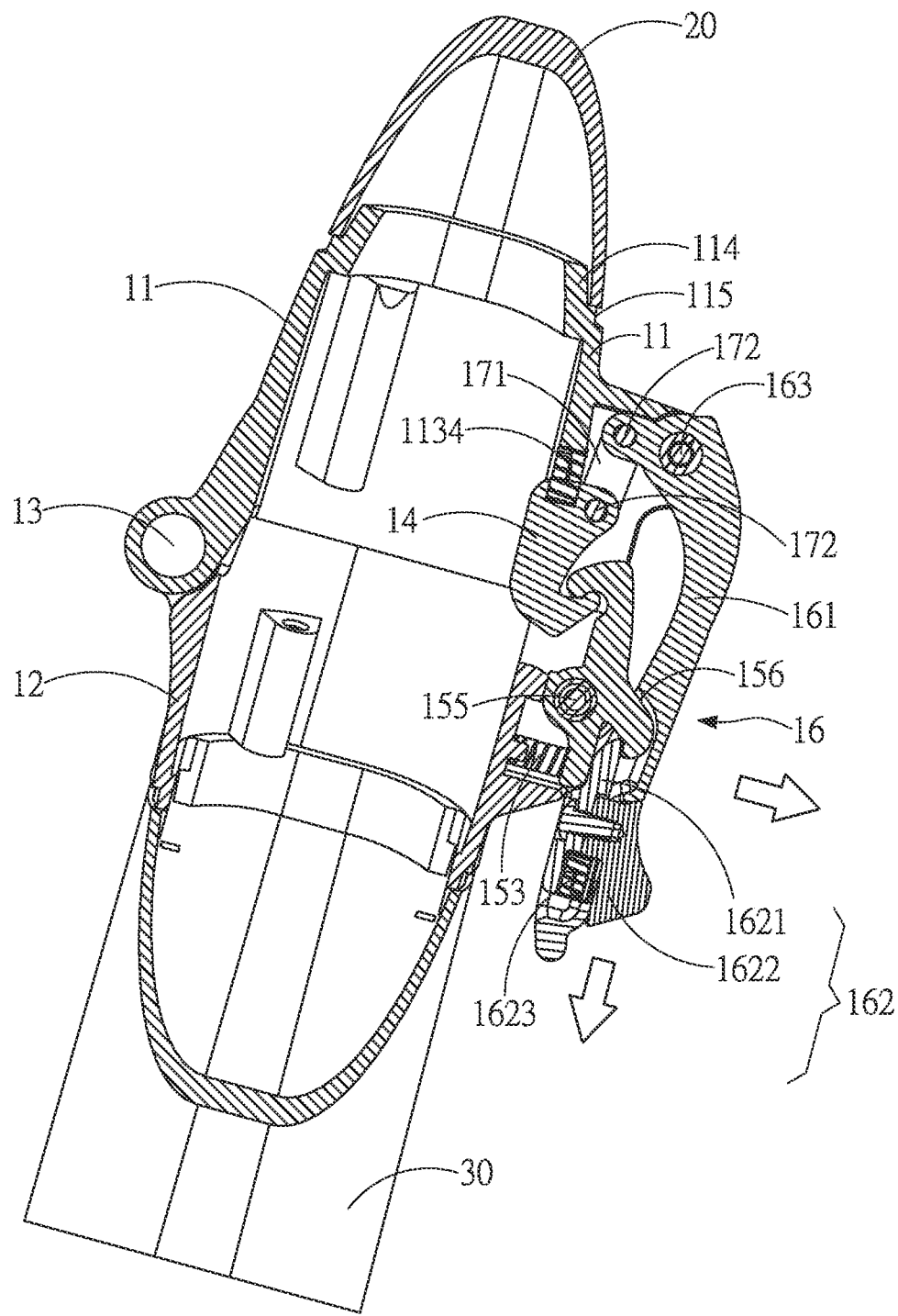

Please refer to FIG. 10 to FIG. 11, which are the cross sectional views of the two stage quick-release structure 10 of the foldable bicycle 100 of the second embodiment. As shown in FIG. 9, when the first stage buckle is completed, the user presses the extended handle 161 of the safety fastener 16 according to the arrows indicated in the figure, so that the safety fastener 16 is rotated to come close to the elastic hook 15 via the second pivoting portion 163.

Please refer to FIG. 10 and FIG. 11, when the safety fastener 16 abuts against the elastic hook 15, the buckling member 1621 of the safety fastener 16 abuts against the guiding plane 156 of the elastic hook 15; in such a condition, before the buckling member 1621 exceeds the guiding plane 156, the user continuously applies force to the buckling member 1621 so that the buckling member 1621 is detached from the second pivoting portion 163 of the safety fastener 16 because of the abutment of the guiding plane 156. Then, the spring 1623 abuts against the buckling member 1621 to provide the resilient force for the pulling member 1622 to come close to the second pivoting portion 163. Thereby, the buckling member 1621 is correspondingly buckled with the hook groove 154 of the elastic hook 15 so as to form the second stage buckle.

In this embodiment, the buckling member 1621 is correspondingly buckled with the hook groove 154 via the resilient force of the spring 1623, but embodiments are not limited thereto; in some implementation aspects, the user moves the pulling member 1622 to buckle the buckling member with the hook groove 154 correspondingly so as to complete the second stage buckle.

Although the disclosure is called a two stage quick-release structure, the user can simply finish the first stage buckle by rotating the first tubing member 11 toward the second tubing member 12 and using a small force to connect the first tubing member 11 with the second tubing member 12. Then, the safety fastener 16 is rotated and pressed to complete the second stage buckle. Thereafter, the assembling of the front bicycle frame body 20 and the rear bicycle frame body 30 is achieved easily by the two stage operation which is much easier in operation than the conventional screw packing structure. Furthermore, the second stage buckle prevents the elastic hook 15 from being pressed unintentionally to release the first stage buckle, thereby improving the safety of the quick-release structure 10.

The following paragraph describes the operation for the storage of the foldable bicycle 100. Please refer to FIG. 12 to FIG. 13, which are the cross sectional views of the two stage quick-release structure 10 of the foldable bicycle 100 of the second embodiment. As shown in FIG. 11, when the user tends to release the quick-release structure 10, the user applies a force on the pulling member 1622 along a direction far from the second pivoting portion 163 firstly until the buckling member 1621 is detached from the hook groove 154; then, the buckling member 1621 is rotated via the second pivoting portion 163 to be away from the elastic hook 15, as shown by the direction of the arrows in the figure, thereby releasing the second stage buckle.

Figure 12:
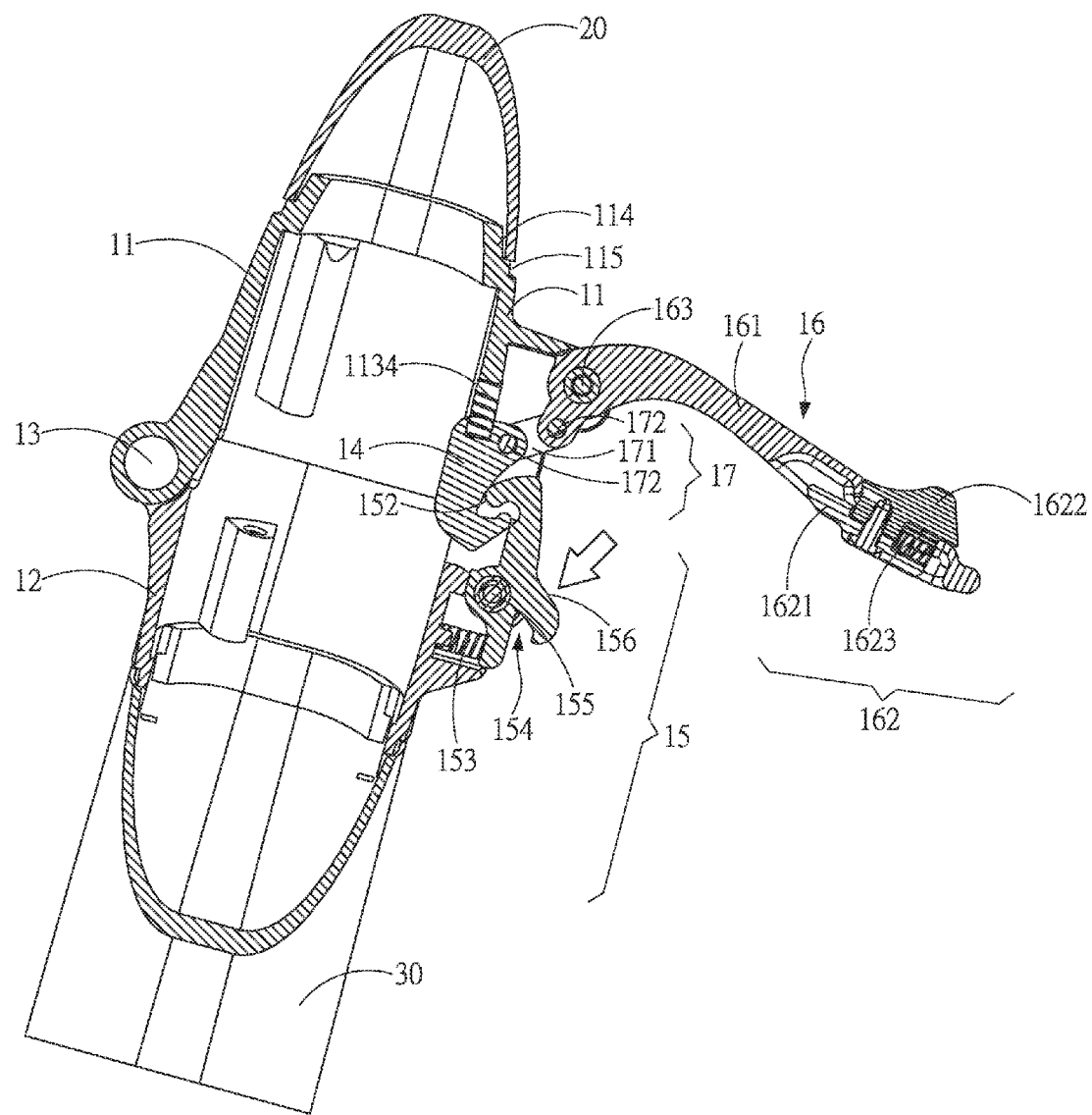
Figure 13:
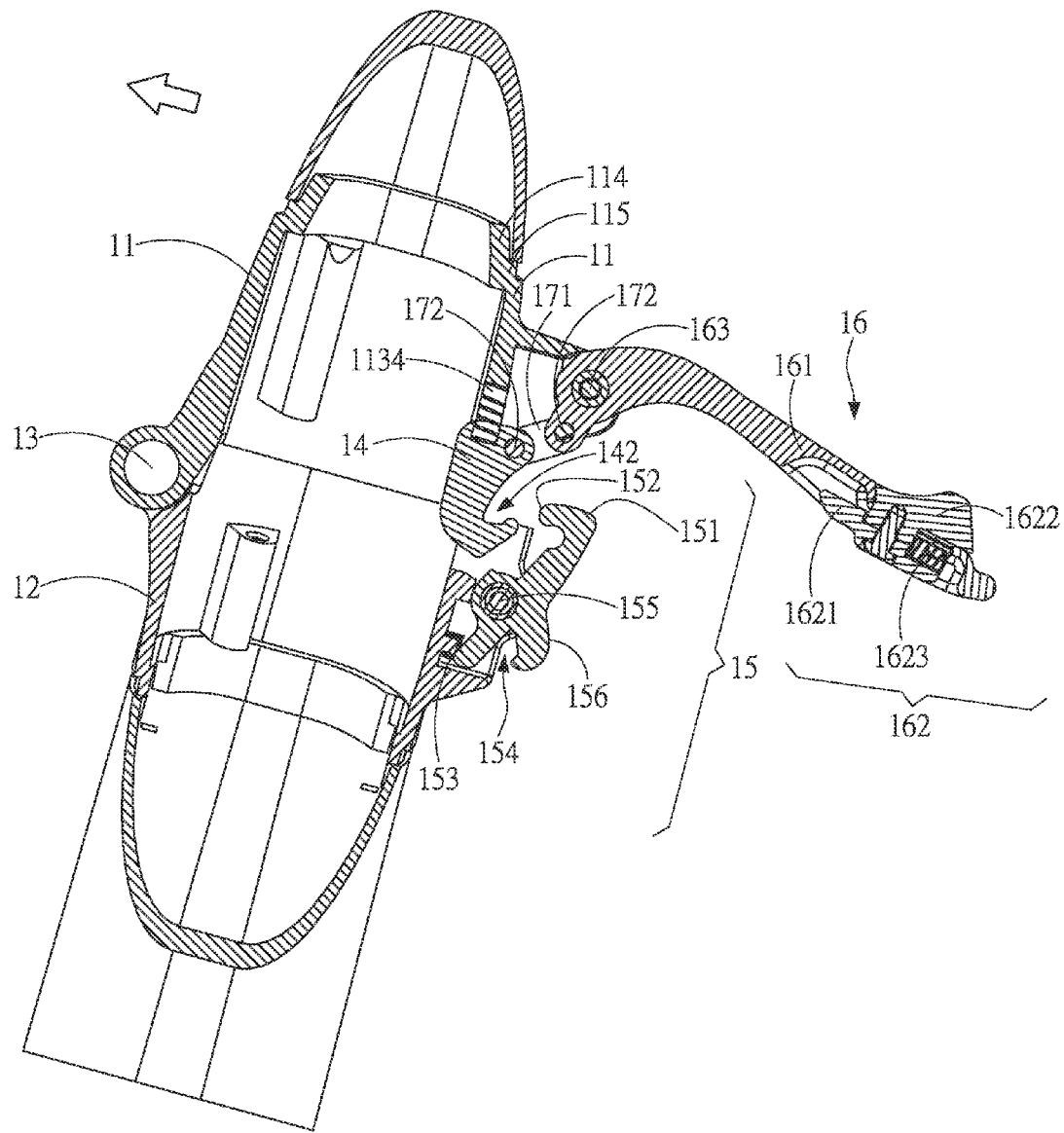

Thereafter, as shown in FIG. 12 and FIG. 13, the user then presses the guiding plane 156 of the elastic hook 15 so as to rotate the elastic hook 15 clockwise via the third pivoting portion 155 until the hook portion 152 of the elastic hook 15 is detached from the buckling groove 142 of the first buckling portion 14. Meanwhile, the first tubing member 14 is rotated via the first pivoting portion 13 to be far away from the second tubing member 12 as indicated by the arrows shown in the figure, thereby releasing the first stage buckle. After releasing both the first stage buckle and the second stage buckle, the user can store the foldable bicycle 100 by folding the bicycle frames.

Additionally, as shown in FIG. 9 and FIG. 11, upon operating the second stage buckle; namely, upon the safety fastener 16 being buckled with the elastic hook 15, the safety fastener 16 drives the connecting member 17 along with the slidable member 1131, so that the slidable member 1131 is moved toward a direction far from the elastic hook 15. Therefore, the first buckling portion 14 is securely buckled with the hook portion 152 of the elastic hook 15.

Such a quick-release structure can not only be buckled securely, but also can be released easily. As shown in FIG. 12, after the second stage buckle is released, the elastic member 1134 provides the resilient force for the slidable member 1131 to come close to the elastic hook 15, so that a distance is maintained between the elastic hook 15 and the first buckling portion 14 connected with the slidable member 1131, thereby releasing the first stage buckle conveniently.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A two stage quick-release structure for foldable bicycle, comprising:
    a first tubing member, comprising a first connecting member and an assembling portion, the first connecting member being disposed at a lateral side of an axial opening of the first tubing member, the assembling portion being disposed on another side of the first tubing member which is opposite to the first connecting member;
    a second tubing member, adjacently connected to the lateral side of the axial opening of the first tubing member, the second tubing member comprising a second connecting member, the second connecting member being disposed at a section of the second tubing member which corresponds to the first connecting member;
    a first pivoting portion, passing through the first connecting member and the second connecting member;
    a first buckling portion, assembled on the assembling portion;
    an elastic hook, pivotally assembled on another side of the second tubing member and corresponding to the first buckling portion, in which another side of the second tubing member is opposite to the second connecting member, wherein when the first tubing member is rotated to connect with the second tubing member by the first pivoting portion, the elastic hook correspondingly buckles with the first buckling portion; and
    a safety fastener, pivotally assembled on the first tubing member, the safety fastener comprising an extended handle, a second buckling portion and a second pivoting portion, the second pivoting portion being disposed at one end of the extended handle, the second buckling portion being disposed at another end of the extended handle which is far from the second pivoting portion, wherein when the safety fastener is rotated to come close to the elastic hook by the second pivoting portion, the second buckling portion correspondingly buckles with the elastic hook.

2. The two stage quick-release structure for foldable bicycle according to claim 1, wherein the first buckling portion comprises an inclined plane and a buckling groove, the inclined plane is disposed at an outer lateral side of the buckling groove, the elastic hook comprises an abutting plane, a hook portion, a resilient member and a third pivoting portion, the elastic hook is pivotally assembled on the second tubing member via the third pivoting portion, the hook portion is disposed at one side of the third pivoting portion, the abutting plane is disposed at a front lateral side of the hook portion, the resilient member provides a rotating resilient force for the hook portion of the elastic hook to come close to the second tubing member.

3. The two stage quick-release structure for foldable bicycle according to claim 2, wherein the elastic hook comprises a hook groove and a guiding plane, the hook groove is disposed at another side of the third pivoting portion which is opposite to the hook portion, the guiding plane is disposed at an outer lateral side of the hook groove.

4. The two stage quick-release structure for foldable bicycle according to claim 3, wherein the second buckling portion comprises a buckling member, a pulling member and a spring, the buckling member is securely assembled on the pulling member, the pulling member is slidably assembled on one end of the extended handle and slidable along the length direction of the extended handle, the spring provides a resilient force for the pulling member to come close to the second pivoting portion.

5. The two stage quick-release structure for foldable bicycle according to claim 1, wherein the first buckling portion and the first tubing member are integrally formed as a whole.

6. The two stage quick-release structure for foldable bicycle according to claim 1, wherein the assembling portion comprises a slidable member and a guiding portion, the slidable member is slidably assembled in the guiding portion.

7. The two stage quick-release structure for foldable bicycle according to claim 6, wherein the assembling portion comprises a connecting member, one end of the connecting member is pivotally assembled on the slidable member, and another end of the connecting member is pivotally assembled on the safety fastener.

8. The two stage quick-release structure for foldable bicycle according to claim 7, wherein the connecting member comprises at least one connecting plate and a plurality of locking members, two ends of the at least one connecting plate are respectively locked to the slidable member and the safety fastener via the locking members.

9. The two stage quick-release structure for foldable bicycle according to claim 6, wherein the assembling portion comprises an elastic member providing a resilient force for the slidable member to come close to the elastic hook.

10. The two stage quick-release structure for foldable bicycle according to claim 1, wherein a connecting tubing is protruded from an opening of another side of the first tubing member along an axial direction thereof in which another side of the first tubing member is opposite to the axial opening, the outer diameter of the connecting tubing is smaller than the outer diameter of the first tubing member.

11. The two stage quick-release structure for foldable bicycle according to claim 10, wherein a stopping portion is assembled on a connecting section between an outer periphery of the connecting tubing and the first tubing member.

12. The two stage quick-release structure for foldable bicycle according to claim 10, wherein at least one positioning rod is protrudingly assembled on the outer periphery of the connecting tubing.

* * * * *